Aug. 26, 1969  B. L. BRESSLER ET AL  3,463,590
CREDIT CARD IDENTIFICATION DEVICE
Filed Feb. 11, 1966  6 Sheets-Sheet 1

INVENTORS
BERNICE L. BRESSLER
MARTIN BRESSLER
BY
ATTORNEY

Aug. 26, 1969  B. L. BRESSLER ET AL  3,463,590
CREDIT CARD IDENTIFICATION DEVICE
Filed Feb. 11, 1966  6 Sheets-Sheet 2

INVENTORS
BERNICE L. BRESSLER
MARTIN BRESSLER
BY
ATTORNEY

Aug. 26, 1969  B. L. BRESSLER ET AL  3,463,590
CREDIT CARD IDENTIFICATION DEVICE

Filed Feb. 11, 1966  6 Sheets-Sheet 3

INVENTORS
BERNICE L. BRESSLER
MARTIN BRESSLER
BY
*Julius L. Rubinstein*
ATTORNEY INVENTORS
BERNICE L. BRESSLER
MARTIN BRESSLER
BY
*Julius L. Rubinstein*
ATTORNEYS Aug. 26, 1969     B. L. BRESSLER ET AL     3,463,590

CREDIT CARD IDENTIFICATION DEVICE

Filed Feb. 11, 1966     6 Sheets-Sheet 5

INVENTORS
BERNICE L. BRESSLER
MARTIN BRESSLER

BY

ATTORNEY

Aug. 26, 1969　　　B. L. BRESSLER ET AL　　　3,463,590
CREDIT CARD IDENTIFICATION DEVICE

Filed Feb. 11, 1966　　　　　　　　　　　　　6 Sheets-Sheet 6

LIGHT SOURCE

INVENTORS
BERNICE L. BRESSLER
BY　MARTIN BRESSLER

ATTORNEY

United States Patent Office 3,463,590
Patented Aug. 26, 1969

3,463,590
CREDIT CARD IDENTIFICATION DEVICE
Bernice L. Bressler and Martin Bressler, both of
3809 Vecino Drive, Covina, Calif. 91722
Filed Feb. 11, 1966, Ser. No. 527,653
Int. Cl. G06k 9/08
U.S. Cl. 356—71                                3 Claims

ABSTRACT OF THE DISCLOSURE

This invention is characterized by a machine which perforates a credit card in a random pattern, but a pattern which is uniquely characteristic of a code word chosen by the applicant for the credit card. At the point of purchase there is a generally duplicate machine, which instead of perforating a card generates points of light. The purchaser feeds into the machine his code word, and the machine recreates on a screen, in points of light the patterns of perforations on the credit card. In this way, by comparing the pattern of perforations on the credit card with the pattern of points of light on the screen the purchaser can be identified as the legitimate owner of the credit card. Unauthorized persons who find or steal the credit card would not know the code word and so would be unable to operate the machine at the point of purchase to match the perforation pattern on the credit card.

This invention relates generally to an indentification device and, more particularly, to a method and apparatus for preventing the use of identification cards by unauthorized persons.

The increasing use of identification cards, particularly credit cards and charge plates, in department stores, gas stations and other businesses, has been accompanied by sharply increasing losses due to credit card frauds. Such losses may amount to hundreds of millions of dollars each year.

A substantial part of these losses occur when credit cards or charge plates are lost, stolen, or counterfeited, and the thief uses them to charge substantial purchases on the account of the true owner of the credit card. In this respect, criminals often steal the entire purse or wallet from a credit-card holder so that they will have the driver's license and other identifying documents of the true owner to provide any additional identification required.

To limit these losses, businesses are resorting to increased use of security forces on the premises and, in some cases, through the use of computers to provide an instant identification of all credit cards reported as stolen. However, such techniques are only marginally successful because the criminal often uses the credit cards a short time after they are stolen and before the true owner is even aware that it is lost.

At any rate, the various methods employed by businesses to reduce their losses have not been very successful because they are inherently unreliable and because of the time and expense involved in requiring clerks to follow approved procedures for limiting such frauds.

Other areas of fraud have occurred when the customer himself has charged items on his own account and then notified the business that the card was lost and some unauthorized person had made purchases on his account. In practice, businesses are very reluctant to directly challenge the report of the customer concerning the loss because of the difficulty of proof, the attendant danger of lawsuits and also because of the problems involved in the loss of good will of the innocent customers who are challenged.

What is needed, therefore, and comprises the principal object of this invention is to provide a method and apparatus for substantially eliminating fraudulent and criminal misuse of credit cards, charge plates, or other identification cards. This and other objects of this invention will become more apparent when understood in the light of the accompanying specification and drawings wherein.

Figure 13:
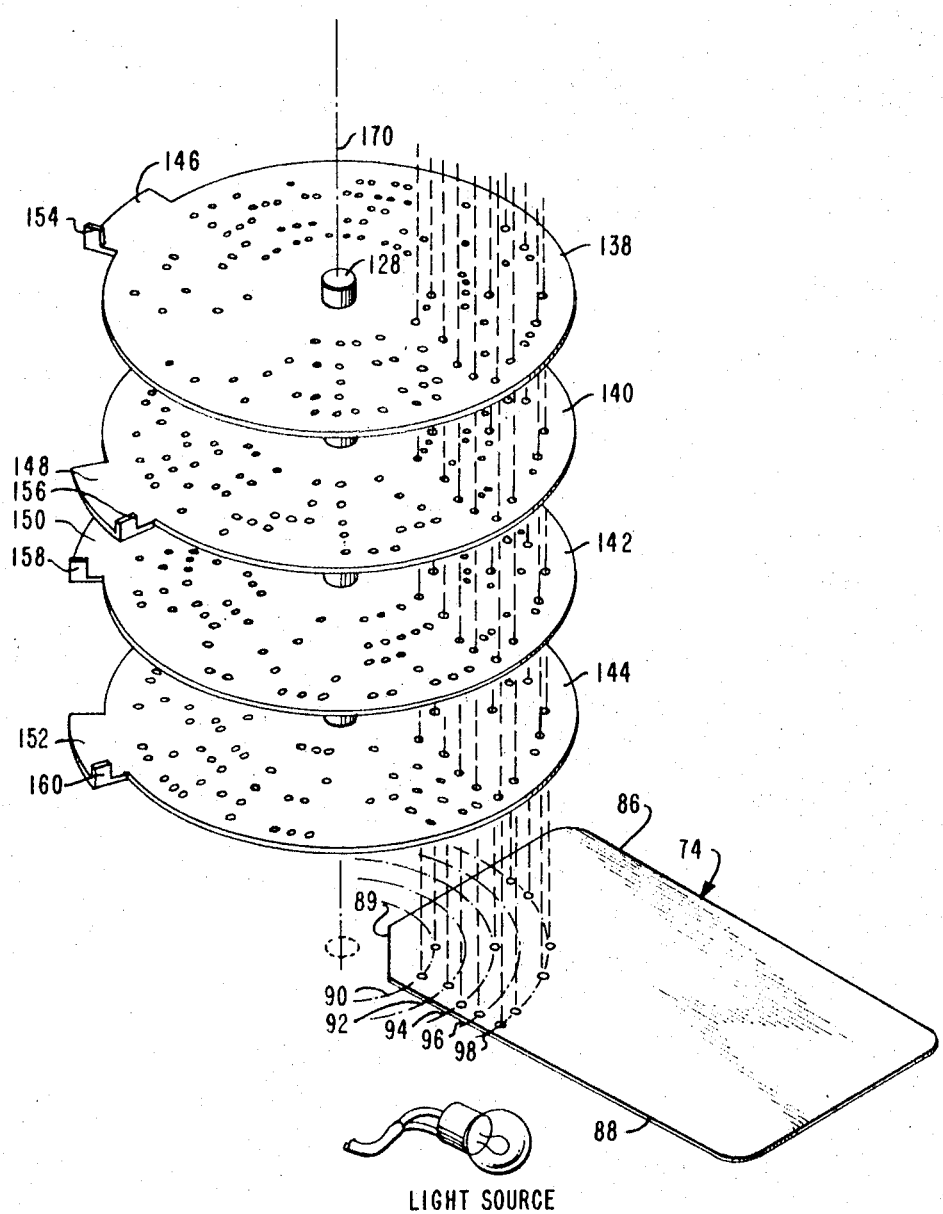
FIGURE 13 is an exploded view illustrating the passage of light through the code plates falling on a credit card.

In general, the device operates this way:

A plurality of perforated code plates (in this embodiment, 4 plates are used) are mounted in spaced parallel relationship and movable with respect to each other in any one of 36 predetermined positions. Each position is identified by a letter or number (26 letters plus 10 numbers). A source of light is directed against the code plates. The code plates are arranged so that they obstruct the passage of light except where the perforations in the code plates are aligned, see FIGURE 13. In such cases, light from the light source passes through these aligned perforations in the code plates and emerges as a limited number of separate light beams. The number and positions of light beams which pass through all of the perforations of the 4 plates will vary for different positions of the code plates. A mechanism of any suitable sort is provided for moving these 4 code plates to any one of the above-described positions. In use, a purchaser of a credit card selects some arbitrary code word or number, as, for example, the word "Mars." The credit card issuing company lays the credit card beneath the code plates and adjusts the 4 code plates so that one code plate would be in the "M" position, the code plate next to the first code plate would be in the "A" position. The third code plate would be in the "R" position and the fourth code plate would be in the "S" position. With this arrangement, a limited number of perforations in all of the four plates will be aligned so that light can pass through all of the code plates and fall on the credit card. Businesses issuing these credit cards would then perforate or mark the credit card at the places where the beams of light from the aligned perforations fall on the credit card.

It is contemplated that each store or organization will have a credit card mechanism or box which has four similar sets of code plates. When a person with a credit card in his possession wishes to identify himself, he adjusts the code plates in accordance with the positions determined by his particular code word. When this is done, the clerk or person requiring identification compares the patterns of light beams emerging from the aligned perforations in the code plates with the pattern of perforations on the credit card.

If a person finds or steals such a credit card, he will not know the code word and he will not be able to position the code plates correctly. If these code plates are incorrectly positioned, the pattern of light beams emerging from aligned perforations in the code plates and falling on a surface will not be the same as the pattern of perforations on the credit card. Consequently, the store or organization requiring identification will be aware that a problem exists in connection with the holder of the credit card.

Figure 1:
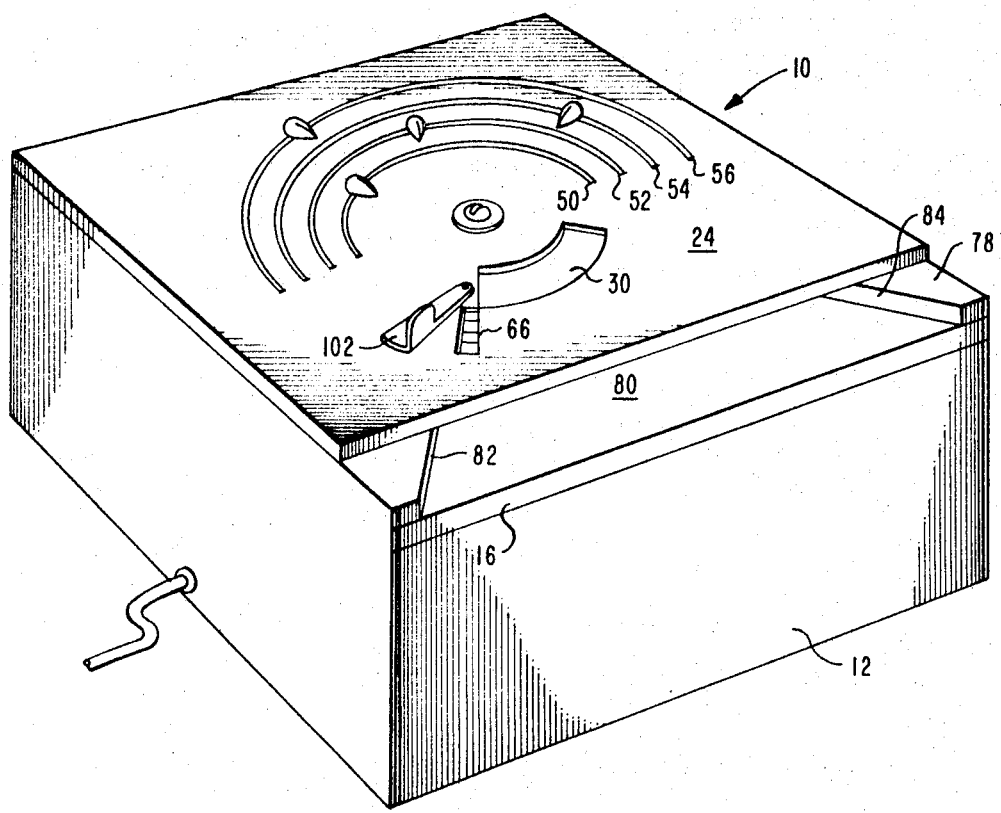
FIGURE 1 is a perspective view of one embodiment of the invention.
Figure 2:
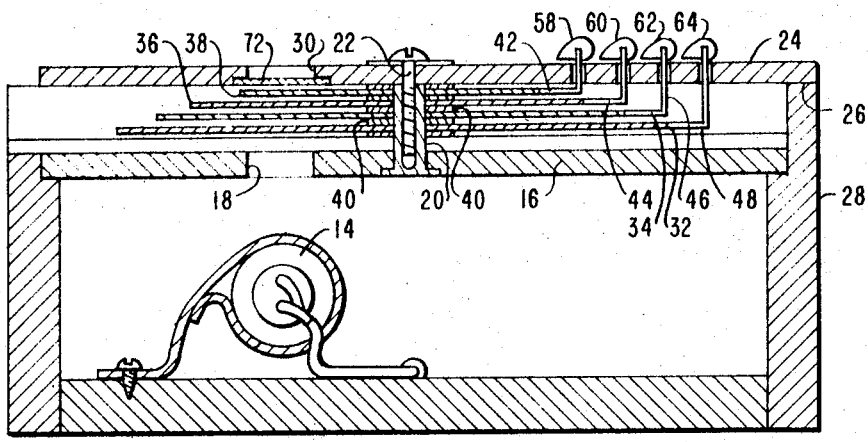
FIGURE 2 is an elevational view of the embodiment shown in FIGURE 1.
Figure 5:
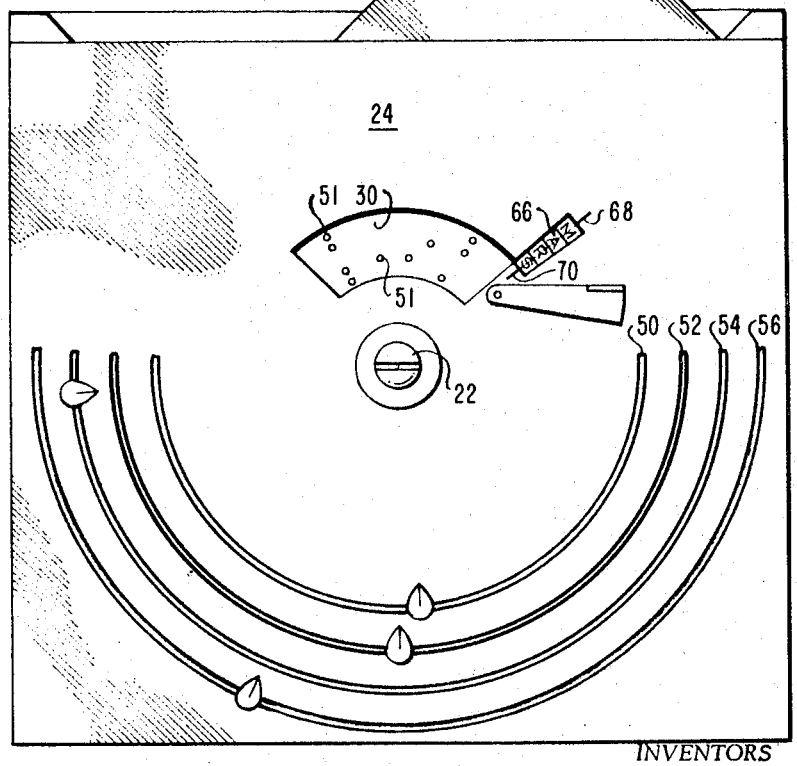
FIGURE 5 is a plan view of the embodiment shown in FIGURE 1 with a proper adjustment for identifying the identification card shown in FIGURE 3.

Referring now to FIGURE 1 of the drawing, the identification device indicated generally by the reference numeral 10 comprises a box-like housing 12. As shown in FIGURE 2, a source of light 14 is mounted in the box. The box is covered by a cover-plate 16 in which an arcuate light transmitting slot 18 is formed. The cover plate 16 is provided with a rigidly mounted, centrally disposed transverse bearing shaft 20. The bearing shaft 20 in this particular embodiment is counter-bored to receive a retaining bolt-shaft 22. The retaining bolt shaft 22 is screw threaded inside bearing shaft 20 and extends through a hole in a top-plate 24. With this arrangement, the top-plate 24 and cover plate 16 are held together in spaced parallel relationship with the top plate resting on the top edges 26 of the walls 28 of housing 12. As seen in FIGURES 2 and 5, the top plate is provided with an arcuate light transmitting slot 30 over slot 18 and in spaced parallel relationship with respect thereto.

Four code plates 32, 34, 36 and 38 are rotatedly mounted on bearing shaft 20 in spaced parallel relationship separated by washers 40. The code plates are all generally circular like that shown in FIGURE 4 but are of increasing diameter successively from the top plate to the cover plate, see FIGURE 2. It is understood, however, the shape of the code plates is not important to the practice of this invention. As seen in FIGURE 2, the code plates are provided with arm portions 42, 44, 46 and 48 respectively. Each arm portion includes an upwardly-bent portion at its free end which extends through one of the narrow 180 degree arcuate slots 50, 52, 54 and 56 in top plate 24. See FIGURES 5 and 6.

Slots 50, 52, 54 and 56 are all at radially increasing distances from the axis of bearing shaft 20 and concentric therewith. Handle portions 58, 60, 62 and 64 are attached to the part of the handles extending through these narrow slots so that the code plates can be conveniently rotated, see FIGURES 2, 5 and 6. It is clear that by pushing the handle portions, the rotative positions of the code plates can be changed with respect to each other.

Figure 4:
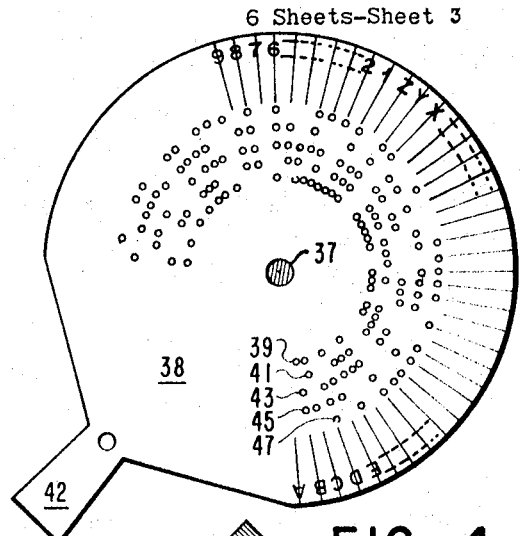
FIGURE 4 is a plan view of a code plate used with this invention.

As shown in FIGURE 4, each code plate is provided with 36 indicia (26 letters of the alphabet and integers 0 to 9). For the particular embodiments shown, the indicia are angularly spaced around the centers 37 of the code plates at 5 degree intervals so that the indicia extend 180 degrees around the center 37. The indicia may be formed with indicia lines extending therethrough for reasons to be described below. The top plate 24 is further provided with a radially extending indicia viewing slot 66 and fixed indicia lines 68 and 70 at each end thereof.

Figure 6:
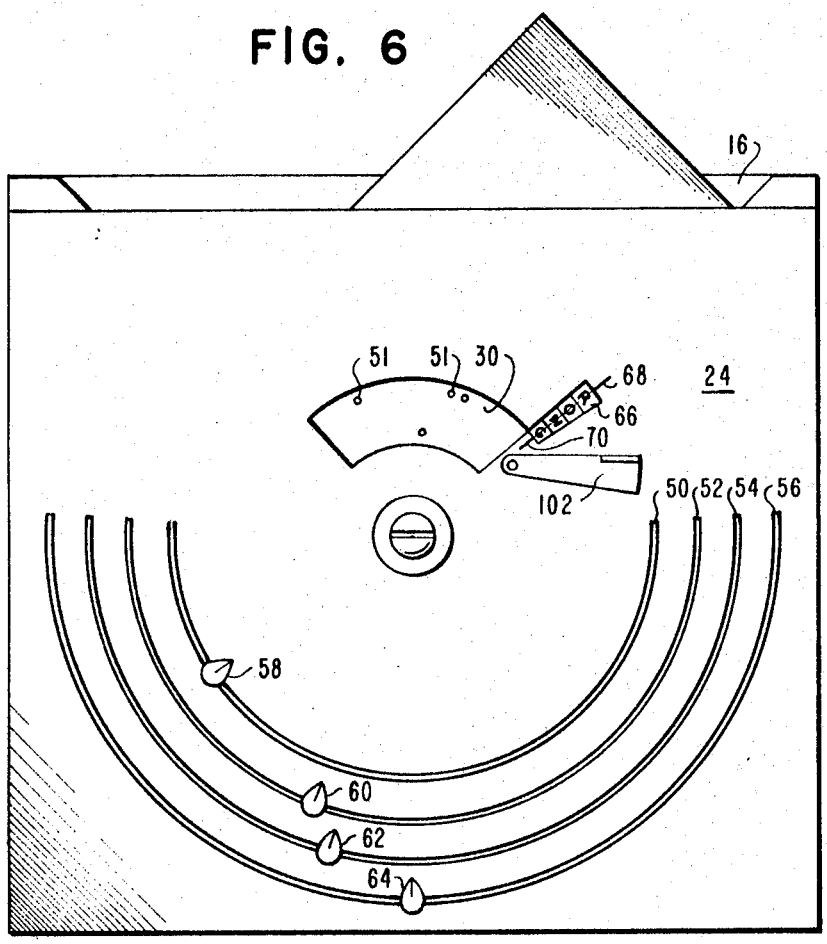
FIGURE 6 is a plan view of the embodiment shown in FIGURE 1 with an improper adjustment for the identification card shown in FIGURE 3.

As seen in FIGURE 2, the code plates are of increasing size from top to bottom and the indicia on each successively larger code plate from the top plate 24 to the cover plate 16 will be at a correspondingly larger distance from the center 37 of its code plate. With this arrangement, by pushing the handle portions around the arcuate slots in top plate 24, the indicia on each code plate can be moved beneath the indicia viewing slot 66 and will appear adjacent to each other in radially spaced relation. In the example shown in FIGURE 5, code plate 38 was rotated to the "M" position, code plate 36 to the "A" position, code plate 34 to the "R" position and code plate 32 to the "S" position, spelling the code word "MARS." As shown in FIGURE 6, the code plates have been rotated until the letters "R" "O" "N" "G" appear in the viewing slot 66.

As shown in FIGURE 4, patterns or groups of perforations are formed in code plate 38 and in the other code plates. In the particular embodiment shown, the perforations in each code plate are disposed on the arcs of circles in five groups. These are groups 39, 41, 43, 45 and 47; see FIGURE 4. It is seen that the perforations in each group are at a fixed distance from the center 37 of the code plates. Each of the adjacent groups of perforations are at a uniformly spaced radial distance from each other and are concentric with the bearing shaft 20. With this arrangement, groups of perforations on each code plate will be in spaced parallel relation to each other and at a fixed distance to the axis of the bearing shaft so that the perforate area of the code plates will be one on top of the other. In addition, for each group of perforations, only spaces at 5 degree intervals are available for perforation and the 5 degree intervals available for perforation are perforated in a random pattern which may be based on a table of random numbers. For reasons to be discussed below, the table of random numbers is selected so that approximately 61% of the available space in each group is perforated. Further, the random perforation pattern in each group is different. With this arrangement, radial rows of perforations will be formed in each code plate at 5 degree intervals from each other, and each row formed by all the groups of perforations will be identified by indicia on the periphery of the code plate, as shown in FIGURE 4.

It is also noted that each of the four code plates are perforated in a different random pattern but with the same average number of perforations. The radial distance of each of the corresponding groups of perforations from center 37 on all of the code plates is the same so that corresponding perforated groups of perforations on each code plate are one on top of the other.

As shown in FIGURE 4, there are 51 rows of perforations so that the perforations beyond the one identified by numeral 9 have no indicia. This is to make certain that if the code plates are rotated so that the letters toward the end of the alphabet or numbers appear in the indicia viewing slot 66, additional rows of perforations will be visible in viewing slot 30. For reasons to become apparent below, it is desirable for viewing slot 30 to subtend an angle of 85° and to be large enough radially to accommodate perforations in all five groups.

Since as stated above, all the code plates may be perforated according to a table of random numbers, and only the spaces in each group on each code plate at 5 degree intervals are available for perforation, there is a likelihood that if the code plates are rotated to any position with respect to each other, and positioned so the indicia corresponding to each row appears in viewing slot 66 with the indicia lines extending through the indicia aligned with the fixed indicia lines 68 and 70, some of the perforations in all four code plates will be aligned. As will be explained, it is desirable to be able to exercise some control over the number of perforations which will be aligned in all four code plates, see FIGURE 13.

Part of this control is exercised in the design of the code plate wherein there are five groups of perforations in each code plate and the spaces available for perforation are at 5 degree intervals with respect to each other. In addition, as stated above, approximately 61% of the available spaces in each group are perforated. Hence, for any rotative position of the code plates, the probability $p$ that four holes in the code plates 32, 34, 36 and 38, are in alignment is $.61^4$ or .1429. Consequently, the probability $q$ of four holes in the code plates not being in alignment is simply $(1-.1429)$. An additional control factor is the size of the view slot 30. The view slot 30, for reasons to become apparent below, must be just large enough so that the aligned perforations in the code plates visible therein, are resolvable into a unique grouping or pattern, for each position of the code plates. Since, as stated above, the view slot 30 is 85 degrees wide, it accommodates perforations in 17 rows. In addition, the radial dimensions of the view slot are designed so that perforations in all five groups may be seen. Consequently, the total number of spaces of aligned perforations available for viewing in slot 30 is 17×5 or 85. Consequently, the average number of aligned holes in the code plates which can appear in the view slot 30 is simply the product of the probability $p \times N$, the number of available spaces or $85 \times .1429$ which equals 12.15.

The standard deviation from this average number of aligned holes which may appear in the view slot is the square root of the product of the probability $p$ that holes will be aligned multiplied by the probability $q$ that the holes in the code plates will not be aligned and the total number of available spaces in view slot 30 or $(.1429 \times (1-.1429) \times 85)^{\frac{1}{2}}$ which equals a standard deviation of about 3 aligned holes. Therefore, 95% of the code plate positions would have between 6 and 18 aligned perforations.

At any rate, it is clear that with the code plates perforated as described above, one may expect to get at least 7 or 8 aligned holes for the various rotative positions of the code plates, and usually several more. As shown in FIGURE 2, the view slot 30 and the slot 18 are aligned with each other and are similar in size and shape.

As shown in FIGURES 2, 5 and 6, the source of light 14 in housing 12 shining through aligned perforations in the code plates causes tiny star-like points of light 51 to appear on the diffusion plate 72 beneath the view slot 30, see FIGURE 2. With this arrangement, there will be a unique grouping of points of light on the diffusion plate for each rotative position of the code plates, see FIGURE 5, and this unique grouping will not be logically related to the positions of the code plates. In other words, by knowing indicia settings for the code plates, one can obtain a unique grouping of points of light, but by knowing a grouping, one cannot easily determine the indicia settings of the code plates. Thus, to this point and by reason of the random distribution of perforations in the code plates, the device may be described as a group mark producing device for producing groupings of physical events not logically related to the adjustments of the device. Consequently, if a card were properly dimensioned and had a grouping of perforations like that shown in FIGURE 5, for example, and this card were positioned so that the perforations in the card were aligned with the tiny star-like points of light on the diffusion plate 72, then, all of the perforations in the card would be illuminated. This provides the basis for using the above-described mechanism for identifying the holder of a card.

Figure 3:
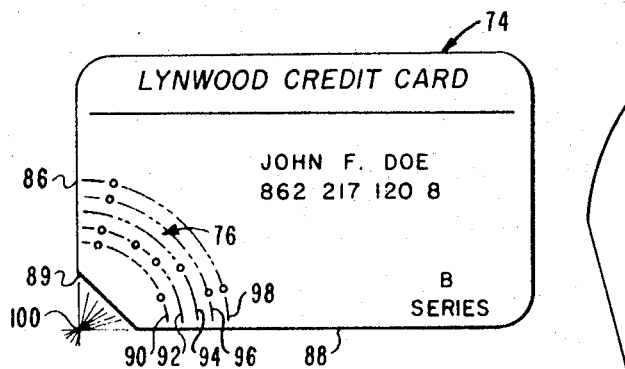
FIGURE 3 is a plan view of an identification card used with this invention.

In practice, a person desiring an identification or credit card or charge plate, selects some arbitrary, easy to remember arrangement of words or letters and numbers. To avoid too much repetition, and to make it difficult for unauthorized persons to discover the resulting unique grouping of star-like points of light, four element combinations of letters and numerals are preferred. In the example shown in FIGURE 5, a four letter combination of the word "Mars" is selected. When the code plates are rotated, as shown in FIGURE 5, so that these letters appear in the indicia viewing slot 66, a unique grouping of star-like points of light 51 will appear in the view slot 30. Then, a card 74 is designed to have a perforation area which corresponds in size to the view slot 30, see FIGURE 3. This card is then perforated so it has the same unique grouping of perforations as the grouping of points of light on the diffusion plates 72, when the code plates are rotated so that the letters "M", "A", "R," and "S" on the code plates appear in the indicia viewing slot 66, see FIGURES 3 and 5. If card 74 is properly aligned with the view slot 30, the unique grouping of star-like points or dots of light which appear on the diffusion plate, will also shine through and illuminate all the perforations on the card 74.

In order to align the card 74 so that the perforations in the perforation area 76 are aligned with the dots of light on the diffusion plate 72, a guide plate 78 is positioned between the cover plates 16 and the top plate 24, see FIGURE 19. The edges of the guide plate 78 are provided with a card receiving recess 80. The walls 82 and 84 of the recess 80 are 90 degrees apart with respect to each other to engage the edges 86 and 88 of the card 74, and extend substantially to the bearing shaft 20.

Edges 86 and 88 of card 74 are at right angles to each other. These edges are designed to bear against the edges 82 and 84 of the guide plate 78. Further, for reasons of design, the adjacent corner of edges 86 and 88 are beveled at 89 to permit card 74 to be set properly in the recess 80. The perforations in card 74 are all on the arcs of five circles. These arcs are identified as 90, 92, 94, 96 and 98, see FIGURE 3. In addition, all of the arcs are concentric with the intersection of edges 86 and 88 at point 100, which is not on card 74 because of the bevel 89. The radial distance between point 100 and arc 90 is the same as the distance between point 37 and the arc of group 39 on the code plates. Similarly, the distance between point 100 and arc 92 is the same as the distance between center 37 and the arc of group 41. The distance between point 100 and arc 94 is the same as the distance between center 37 and the arc of group 43. The distance between point 100 and arc 96 is the same as the distance between center 37 and the arc of group 45. The distance between point 100 and arc 98 is the same as the distance between center 37 and the arc of group 47.

With this arrangement, when card 74 is inserted in recess 80 until the edges 86 and 88 bear against edges 82 and 84 on guide plate 78, the perforations in card 74 (which, as stated above, is perforated so that it has the same unique grouping as the grouping of star-like points of light 51 on diffusion plate 72 when the code plates have been rotated to the "M" "A" "R" "S" position) will be aligned with these points of light 51 on the diffusion plate 72 and will appear illuminated. Of course, for any other rotative position of the code plates, the star-like pattern of points of light on the diffusion plate will be quite different from that on the card 74. This is shown by a comparison with the pattern of points of light shown in FIGURE 6, wherein the code plates are rotated to the "R" "O" "N" "G" position.

The perforations in card 74 and in the code plates are quite small, so to precisely position the code plates, the letters and numbers indicia on the code plates are provided with fine indicia lines extending therethrough, which can be aligned with the indicia lines 68 and 70 on top plate 24.

To use the above described mechanism for identification purposes, as where card 74 is a credit card or charge plate, the customer arbitrarily selects an easy to remember code word or combination of letters and numbers. It is contemplated that the company issuing the card 74 will also have a device 10 and by rotating the code plates to the positions determined by the customer's choice of letters or choice of letters and numbers, the company can see the resulting unique grouping of star-like points of light and can perforate or mark the card 74 accordingly, but within the limits described above, on arcs 90, 92, 94, 96 and 98. Of course, the grouping of perforations on each customer's card will be different if his code word is different.

When the customer with his uniquely perforated credit card or charge plate goes to a store or business which issues this kind of charge plates, he will find one or more devices 10. To identify himself, the customer inserts his own card into recess 80 and rotates the code plates until the indicia corresponding to his personally selected combination of letters or letters and numbers appears in the indicia viewing slot 66. If card 74 is properly positioned, the perforations in card 74 will be aligned with the aligned perforations in the code plates. In this way, light from light source 14 can pass through the aligned perforations in the code plates and card 74 and appear as points of light 51 on diffusion plate 72. Then, the customer may cover the slot 66 by cover plate 102 so that the clerk cannot see his code word. The clerk, however, can see the grouping of star-like points of light on the diffusion plate 72 and compare it with the grouping of perforations on card 74 which will all appear illuminated and this will identify the customer.

If the credit card is lost or stolen, no other person will know the customer's code word, so that no one except the customer, will be able to position the code plates on device 10 so that the pattern or grouping of points of light on the diffusion plate 72 corresponds with the pattern of perforations on the lost or stolen card. In this way, losses due to improper or fraudulent use of credit cards or charge plates will be vastly reduced.

Even if the entire device 10 falls into the hands of a person desiring to use a particular stolen card, it would be, for all practical purposes, impossible for such a person to find the particular code word or combination of letters and numbers which would produce the same light pattern as the pattern of perforations on the card. This is because the pattern of perforations on the code plates are random and do not follow any logical pattern. In addition, there are 1,679,616 possible code words. Because of the large number of possible code words and because of the random pattern of the perforations, each possible code word would have to be tried until the desired pattern is found. If it took only 10 seconds to dial a code word and compare groupings, it would take 194 days and nights of continuous effort to search all of the patterns.

In the embodiment shown in FIGURE 1, the clerk or store employee would (after the customer positioned the code plates) observe the pattern of points of light appearing on the diffusion plate 72 before and after the credit card 74 is inserted in slot 80 to see if there is a change in the pattern.

Figure 8:
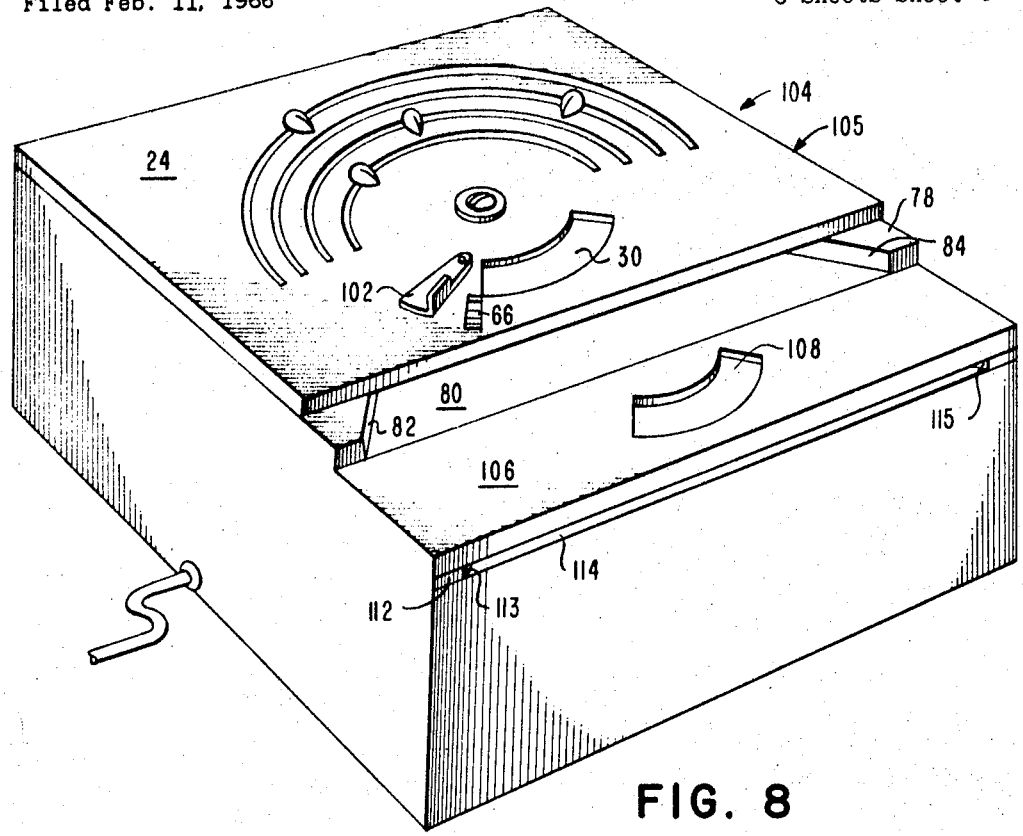
FIGURE 8 is a perspective view of a further embodiment of this invention.

It is apparent, however, that the principles of this invention can be practiced otherwise than as shown in FIGURE 1. In particular, the embodiment 104, shown in FIGURE 8, is very much like that shown in FIGURE 1 and, for that reason, corresponding parts will have the same reference numerals. However, the embodiment of FIGURE 8 differs from that of FIGURE 1 in that its housing 105 is provided with a stepped extension forming a separate top plate 106. This top plate is provided with a view slot 108 exactly like view slot 30. The view slot 108, in this particular embodiment, is open ot the interior of the housing 105 so that the light 14 inside housing 105 shines up through the slot 108. The top plate 106 is spaced from the top walls of housing 105 by a guide plate 112. This guide plate is like guide plate 78 and includes a card receiving recess 114. The edges 113 and 115 of recess 114 are at 90 degrees with respect to each other and they are positioned so that card 74 can be inserted in the card receiving recess 114 until the perforate area 76 is positioned underneath view slot 108. If this is done, the light source in housing 105 will shine directly through the perforations in card 74 and illuminate them. The operation of the code plates in the embodiment shown in FIGURE 8 is exactly like that shown in FIGURE 1 so that once the code plates are positioned, the star-like groupings of points of light 51 will appear in the view slot 30. This can be compared with the illuminated perforations on the card 74 inserted in recess 114. Since the light shining through the perforations in the card, when in slot 114, will not have to pass through the code plates, they will appear much brighter and can be easily compared with the grouping of points of light in view slot 30. Alternatively, in the embodiment shown in FIGURE 8, card 74 may be marked with dots of ink or some suitable material instead of perforations. If this is done, when the card is inserted in slot 108, the pattern of markings on the card visible in slot 108 can be compared with the pattern of points of light in slot 30.

Although it is not always necessary, the card 74 can also be inserted in recess 30 as described in the embodiment shown in FIGURE 1 and the patterns of light can be observed in the view slot 30 both with and without the card inserted in the recess 80.

Figure 9:
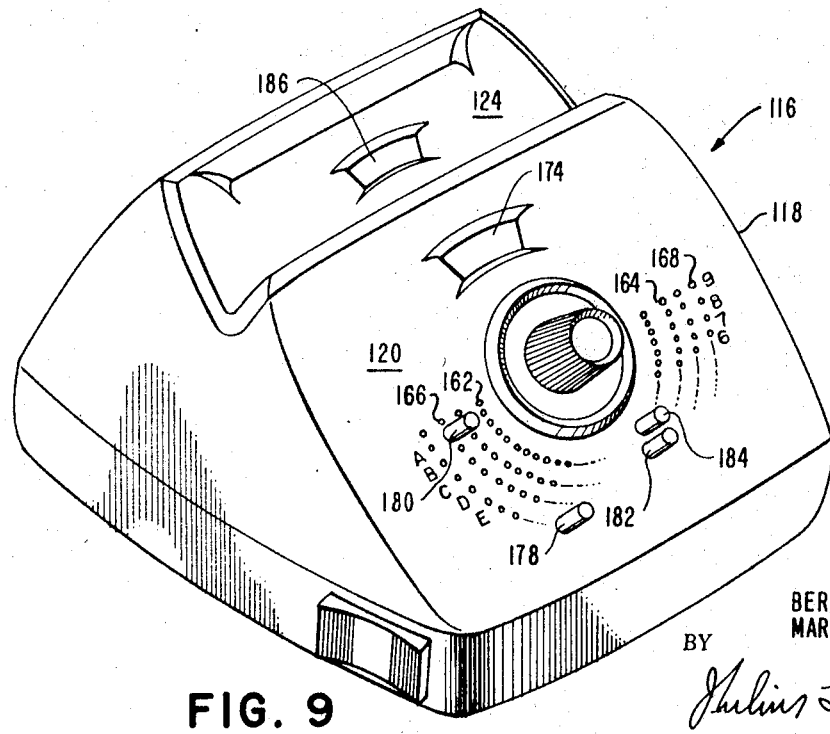
FIGURE 9 is a perspective view of still another embodiment of this invention.
Figure 10:
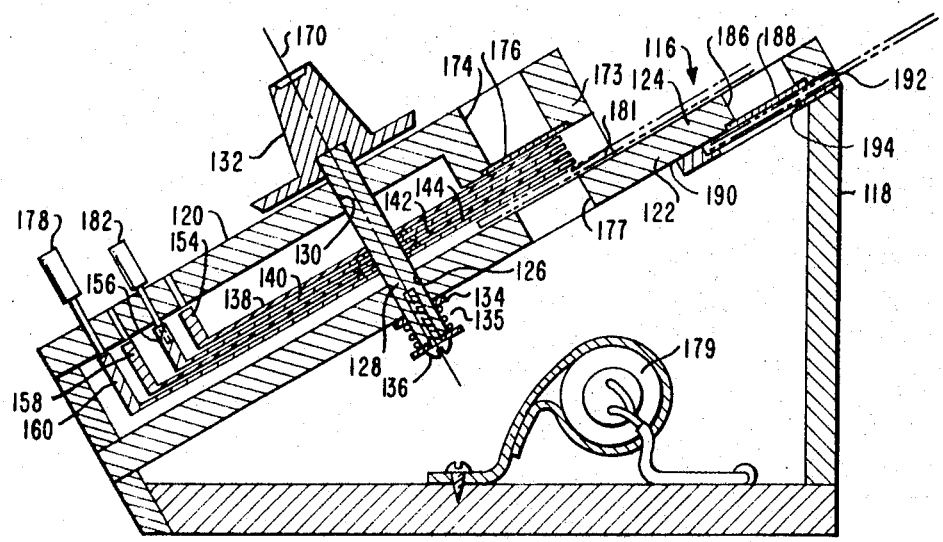
FIGURE 10 is a side-elevational view of the embodiment shown in FIGURE 9.

Another embodiment 116 of this invention is shown in FIGURES 9 and 10. This embodiment comprises a housing 118 with a first top plate 120 inclined at an angle with respect to the base for ease in viewing. A cover plate 122 with an extension 124 serving as a second top plate is mounted on the walls of the housing in spaced parallel relationship to the top plate 120. The cover plate 122 is bored at 126 to receive a transversely extending rotatably mounted shaft 128. Top plate 120 is also provided with a bore 130 aligned with bore 126 for receiving shaft 128, and shaft 128 extends through both bores and is rotatably mounted therein. The top of shaft 128 is provided with a knob 132 rigidly secured thereto, whereby shaft 128 can be rotated. The base of the shaft is provided with a washer 134 and a spring 135 carried by a bolt 136 is threaded into the lower portion of shaft 128. This arrangement forces the washer 134 against the bottom surface of cover plate 122 to maintain a substantially constant resistance to rotation in shaft 128 and provides a convenient way to hold the top plate 120 and cover plate 122 together.

Figure 11:
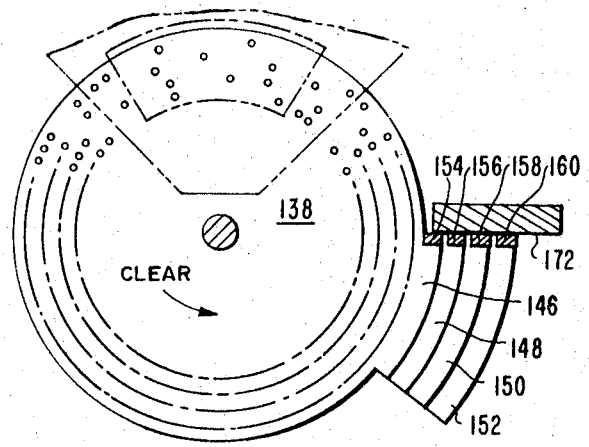
FIGURE 11 is a plan view of the code plates in the embodiment shown in FIGURE 9, all in a clear position.
Figure 12:
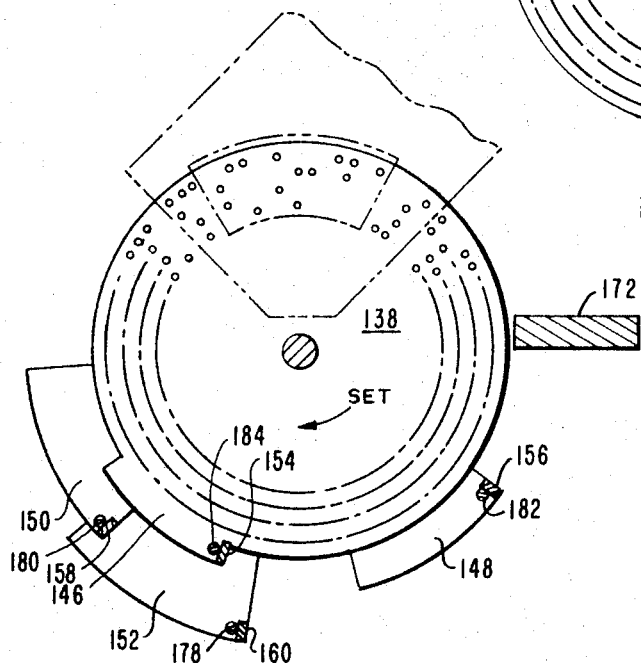
FIGURE 12 is a plan view of the code plates shown in the embodiment of FIGURE 9, in an adjusted position.

Four code plates, 138, 140, 142 and 144, are press fitted onto shaft 128 and are in spaced parallel relationship to each other, separated by washers of appropriate thickness, see FIGURES 10, 11 and 12. These code plates can rotate against the frictional resistance of their press-fit on bearing shaft 128 and they are perforated the same way as the perforations in code plates 32, 34, 36 and 38 described above.

The code plates are all generally circular in shape (although this is not a necessary limitation) and are provided with arcuate radial extensions 146, 148, 150 and 152, see FIGURES 11 and 12. Extension 148 is radially larger than extension 146; extension 150 is larger than extension 148; extension 152 is larger than extension 150, all by the same radial amount. The radial extensions are each provided with upstanding abutments 154, 156, 158 and 160. The abutments vary in size so that their top portions are all a fixed distance beneath top plate 120, see FIGURE 10.

The top plate 120 is provided with groups 162, 164, 166 and 168 of pin receiving perforations. Each group of perforations is on the arc of a curve and the distance of group 162 from the center line of axis 170 of shaft 128 is equal to the distance between the center of abutment 154 and the center line 170. The distance of the perforations in group 164 from center line 170 is equal to the distance between the center of abutment 156 and the center line 170. The distance of the perforations in group 166 from center line 170 is equal to the distance between abutment 158 and center line 170. The distance of the perforations in group 168 and center line 170 is equal to the distance between abutment 160 and center line 170.

The pin receiving perforations in each group on top plate 120 are at 5 degree intervals and for the particular embodiment shown, each group has 36 pin receiving perforations. As seen in FIGURE 9, the pin receiving perforations in each group are all aligned so that corresponding perforations in each group extend radially from center line 170 to form radial columns. Each column is identified by indicia ranging in letters from A to Z and from numbers 0 to 9.

The clearing bar 172 is secured to the underside of top plate 120 for reasons to be discussed below. The top plate 120 is provided with a view slot 174 which overlies a slot 177 in the cover plate 122, see FIGURE 10. The housing 118 is provided with a light source 179 beneath the slots 174 and 177. As seen in FIGURE 10, the diffusion plate 176 is mounted beneath slot 174 and the perforate code plates are positioned beneath the diffusion plate 176 and over slot 177. With this arrangement, when any perforations in the four code plates are aligned, they appear as star-like points of light on the diffusion plate 176.

Guides, not shown, positioned on the cover plate 122 provide a recess 181 and an entrance for the card 74. These guides position the card 74 so that the perforations in the card are beneath the perforations in the code plates. In this way, if the perforations on the card have the same pattern as the aligned perforations in the code plates, the card perforations and the aligned perforations in the code plates, will also be aligned. With this arrangement, if the code plates are properly positioned, as described in connection with the embodiment shown in FIGURE 1, the star-like patterns of light appearing on the diffusion plate will appear the same, both before and after the card 74 is inserted in the recess 181 on the cover plate 122. If the code plates are not properly positioned, the light pattern on the diffusion plate will change when a card is positioned in the recess.

Four pins 178, 180, 182 and 184, one for each group of perforations, are adapted to be inserted in each associated group of the pin receiving perforations in the top plate 120, see FIGURE 9. Each pin is to be inserted in any one of the pin receiving perforations in its group. For example, if the customer has selected the code word, MARS, and has had his card 74 perforated accordingly, he would insert pin 178 in the "M" position of group 168, pin 180 in the "A" position of group 166, pin 182 in the "R" position of group 164, and pin 184 in the "S" position of group 162. As shown in FIGURE 10, the base of the pin extends below the top plate 120 to a point in the path of abutments 154, 156, 158 and 160. Then the customer rotates knob 132 and the code plates from the initial clear position shown in FIGURE 11 in the clockwise or set direction. As he does this, the abutments on the code plates engage the pins 178, 180, 182 and 184. As the abutment on each code plate strikes the pin, it cannot no longer rotate with the shaft 128 and the remaining code plates, so the shaft and upstopped code plates rotate with respect to the stopped code plates.

This continues until the abutments on all of the code plates have struck all of the pins. When this happens, all the code plates become stationary and further rotation of shaft 128 produces no further change in the pattern of light dots appearing on the diffusion plate, see FIGURE 12. Then the customer removes the pins and inserts his card as described above and calls the clerk to come and compare the pattern of perforations on his card with the light patterns on the diffusion plate 176. It is noted that with the pins removed, the clerk cannot determine the rotative positions of the code plates and so, cannot learn the code word.

After the clerk is satisfied, the machine 116 may be cleared by rotating knob 132 and the code plates in the opposite direction until all of the abutments engage and are stopped by the clearing bar 172 in the clear position shown in FIGURE 11. When this is done, further rotation of the knob 132 and shaft 128 produces no further changes in the pattern of light on the diffusion plate 174 and the device 116 is ready to be used again.

The device 116 is used in the same way as described in the embodiments shown in FIGURES 1 and 8 to identify customers possessing credit cards or charge plates by having the customer's card perforated or marked with a unique pattern of perforations or marks determined by the customer's choice of code words, and then having the customer operate the device so that the patterns of aligned perforations on the code plates is identical with the pattern of perforations or marks on the card.

The device 116 is provided with the additional slot 186 formed on the extension 124 of the code plate. This slot is identical in size and shape with slot 174 and diffusion plate 188 is mounted on the base of the slot. A support plate 190 is mounted slightly below the diffusion plate 188 and defines a recess 192 for receiving a card 74. The support plate may be provided with a slot 194 below slot 186 to permit light from source 179 to shine through the diffusion plate.

Guides, not shown, can position card 74 inserted in the recess so that the perforate pattern on the card is below slot 186 and above slot 194. With this arrangement, the light source 179 shining through slots 194 and 186 and through the perforations in the card 74 cause the perforation pattern on the card to appear as bright dots of light on the diffusion plate 188. If the code plates on the device 116 are adjusted properly, the patterns of light appearing in slot 186 will be identical to the patterns of light appearing in slot 174. Of course, as stated in connection with the embodiment shown in FIGURE 8, the card can also be inserted in the recess 181 as described above to further check the pattern of light appearing on the diffusion plate 176 before and after the card is inserted in the recess 181. In addition, as stated in connection with the embodiment shown in FIGURE 8, card 74 could be marked with dots of ink or the like, instead of perforated and the patterns of dots could be compared with the patterns of points of light appearing in slot 174.

Figure 7:
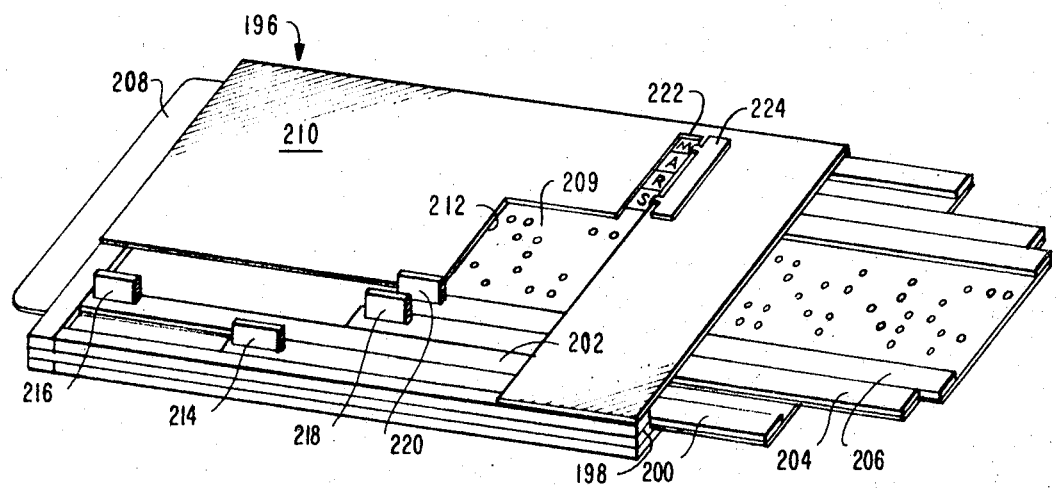
FIGURE 7 is a perspective view of another embodiment of this invention.

Still another embodiment 196 of this invention is shown in FIGURE 7. This embodiment comprises an outer channel shape support 198. Slidably mounted in the channel shaped support 198 and nesting in each other are channel shaped code plates 200, 202, 204 and 206. Each code plate is provided with five rows of perforations. The perforations in each row may be only on positions a predetermined distance apart and the positions available for perforations are all perforated in a random pattern, which may be based on a table of random numbers. As described above, the rows of perforations in each code plate all overlie each other for reasons to become apparent below.

The support 198 is provided with a cover 210. This cover is spaced above support 196 to provide a recess for receiving the card 208. Card 208 is perforated but because the perforations in the code plates extend linearly, the perforate area 209 on card 208 will also extend linearly, and cover a rectangular area. In this way, the perforations on the card could be moved beneath the cover 210 over the perforations in the code plates.

The cover 210 is provided with a recess 212 sized to accommodate the perforation area 209 on card 208. The base of support 196 is also provided with an opening (not shown) sized to permit light to shine through and penetrate the aligned openings in the code plates and the perforations in the perforate area on card 208.

The flanges of the channel shaped code plates are provided with indicia corresponding to the positions available for perforations on the code plates. The indicia extends from the letters A to Z and from numbers 0 to 9.

Each of the code plates are provided with upwardly projecting flanges 214, 216, 218 and 220, for moving the code plates. The cover 210 is also provided with a narrow indicia viewing slot 222.

With this arrangement, the customer using the device 196 can adjust the code plates so that the code word appears in the viewing slot 222 as, for example, the code word "MARS." Then, if a light source is applied to the base of the support 198 and the card 208 is properly positioned beneath the cover 210, all the perforations in the card 208 will appear illuminated. With this arrangement, the embodiment shown in FIGURE 7 can also be used to identify persons carry identification or credit cards as described above. To conceal the code word, the cover 210 is provided with a hinged door 224 which is designed to close over the indicia viewing slot 222 to conceal the code word from the clerk or person checking identification.

While the foregoing discussion and description of this invention has been made in conjunction with specific apparatus, this has been by way of example and is not to be considered as limiting the scope of this invention.

We claim:

1. An identification device of the class described comprising in combination a housing, a source of light in said housing, said housing having a cover plate and a top plate in spaced parallel relation to each other, a bearing shaft rotatably mounted in said cover plate, a plurality of code plates press fit on said bearing shaft between said top plate and said code plates, for rotation thereon against the frictional resistance of their press fit, each code plate having a radial extension, the radial length of said extension increasing from top to bottom, each radial extension provided with an upstanding abutment, the top edge of all abutments a fixed distance below said top plate, said top plate having groups of pin-receiving perforations on the arc of circles, each group concentric with said bearing shaft and in spaced radial relation with respect to each other, the distance of each group of pin-receiving perforations from the bearing shaft equal to the distance of an associated abutment from said bearing shaft, said pin-receiving perforations disposed at fixed angular intervals with each group of perforations containing a plurality of perforations, the pin-receiving perforations in each group all positioned so that corresponding perforations in each group extend radially from the axis of the bearing shaft to form radial columns, each column identified by an indicia associated therewith, said indicia formed on said top plate, said bearing shaft having a grasping portion of said top plate whereby the bearing shaft in all the code plates can be rotated together, each of said code plates having a perforate area, the perforations of each perforate area disposed in a plurality of groups, each group of perforations on an arc of a circle and concentric with said bearing shaft, only positions at said fixed angular interval in all groups available for perforation, corresponding positions in each group in radially spaced relation to each other and to indicia formed on said top plate whereby radial rows of perforations are formed on each code plate, the positions available for perforation in each group perforated in a random pattern, the random pattern of at least some groups different for at least some code plates, the number of groups of perforations and the number of perforations sufficiently large so that for any of said positions on said code plates, some of the perforations in said code plates will be aligned so that light from said light source in the housing will shine through said aligned perforations, said top plate and said cover plate having aligned openings, with the opening in the top plate serving as a view slot, a diffusion plate mounted in said view slot whereby light from said light source in said housing shining through said aligned perforations in said code plates and falling on said diffusion plate becomes visible in said view slot as a unique grouping of points of light different for each position of said code plates, an identification card having a grouping of perforations thereon, said housing having guide means for positioning the identification card in said housing with said grouping of perforations beneath said view slot whereby if said code plates are properly positioned, the aligned perforations in the code plates will be aligned with the perforations in the identification card, so that when the identification card is in the housing and the code plates are properly positioned, the grouping of points of light on the diffusion plate will be the same whether the identification card is inserted in the housing or not, a plurality of pins, one pin for each group of pin-receiving perforations in the top plate for insertion in said pin-receiving perforations with the base of said pins extending below said top plate in the path of said abutments, so that by inserting pins in the pin-receiving perforations in the top plate opposite appropriate indicia in the top plate and rotating the grasping portion of the bearing shaft, the code plates rotate until the abutments on the code plates engage the associated pins, whereby the code plates are stopped and the bearing shaft rotates with respect to the engaged code plates, permitting the code plates to be rotated to any desired rotative position with respect to each other and to the housing, so that a person wishing to be identified and knowing the indicia associated with the radial rows of perforations on the top plate which produce the same grouping of aligned perforations as on the identification card can adjust the code plates to these required positions by inserting the pins in the appropriate pin-receiving perforations in the top plate and rotating the grasping portion of the bearing shaft until all the abutments on the code plates engage said pin and then removing the pins so that a person demanding identification will not know the required indicia for positioning the code plates, and then showing the person demanding identification that the perforations on his identification card are all illuminated when his card is inserted in the housing and the grouping of points of light on the diffusion plate is the same whether or not the identification card is inserted in the housing.

2. The identification device described in claim 1 including a clearing bar mounted on the under surface of the said top plate, said clearing bar radially extending and in the path of said abutments, whereby after said code plates have been rotated in one direction to reach required positions, the code plates can be reset by rotating said code plates in the opposite direction until all of the abutments on said code plates engage the radially extending clearing bar whereby all of the abutments will be aligned and the identification device can be used again.

3. The identification device described in claim 2 wherein said housing is provided with an additional view slot with a diffusion plate mounted therein, additional guide means for receiving an identification card so that the perforations on said identification card lie beneath said additional view slot, whereby light from said light source shining through the perforations in said identification card and falling on said additional diffusion plate will form a pattern of points of light which can be compared with the grouping of points of light from the aligned perforations in the code plates.

References Cited

UNITED STATES PATENTS

| | | | |
|---|---|---|---|
| 585,468 | 6/1897 | Fuller | 235—78 |
| 2,052,844 | 9/1936 | Prusso et al. | |

(Other references on following page)

UNITED STATES PATENTS

| | | |
|---|---|---|
| 2,462,338 | 2/1949 | Sieradzki _____ 235—78 |
| 2,714,201 | 7/1955 | Whitehead. |
| 2,965,292 | 12/1960 | Lewis _____ 235—78 |
| 3,049,051 | 8/1962 | Debrie _____ 350—159 XR |
| 3,054,203 | 9/1962 | French _____ 350—272 XR |
| 3,117,491 | 1/1964 | Stern. |
| 3,262,124½ | 7/1966 | Albiani. |
| 3,383,513 | 5/1968 | Douglas _____ 250—206 XR |
| 3,387,265 | 6/1968 | Smeiman. |
| 3,394,472 | 7/1968 | Stein _____ 35—74 |

FOREIGN PATENTS

| | | |
|---|---|---|
| 206,549 | 3/1957 | Australia. |
| 626,844 | 9/1961 | Canada. |

JEWELL H. PEDERSEN, Primary Examiner

T. MAJOR, Assistant Examiner

U.S. Cl. X.R.

40—2.2; 283—7